United States Patent [19]
Haas et al.

[11] Patent Number: 5,546,784
[45] Date of Patent: Aug. 20, 1996

[54] ADJUSTABLE FORM DIE

[75] Inventors: Edwin G. Haas, Seaford; Martin Kesselman, Commack, both of N.Y.

[73] Assignee: Grumman Aerospace Corporation, Los Angeles, Calif.

[21] Appl. No.: 349,434

[22] Filed: Dec. 5, 1994

[51] Int. Cl.$^6$ ............................ B21D 37/02; B21D 37/14
[52] U.S. Cl. .............................. 72/413; 72/473; 72/478
[58] Field of Search ........................... 72/413, 473, 478, 72/7, 31, 442, 444

[56] References Cited

U.S. PATENT DOCUMENTS

| | | | |
|---|---|---|---|
| 4,131,003 | 12/1978 | Foster et al. | 72/7 |
| 4,212,188 | 7/1980 | Pinson | 72/413 |
| 4,548,065 | 10/1985 | Vyhnal | 72/478 |
| 5,187,969 | 2/1993 | Morita | 72/413 |

OTHER PUBLICATIONS

Webb, R. D., et al., "A Transfer Function Description of Sheet Metal Forming for Process Control", (Nov. 1989) (Manuscript received Apr., 1988 for publication in the Journal of Engineering for Industry).

*Primary Examiner*—Lowell A. Larson
*Assistant Examiner*—Rodney A. Butler
*Attorney, Agent, or Firm*—Terry J. Anderson; Karl J. Hoch, Jr.

[57] ABSTRACT

This invention details a computer controlled self adjusting sheet metal forming die which can provide rapid contour changes. It eliminates the need to manufacture, store, and change individual forming dies for forming different contours, and comprises a computer control device which sends appropriately timed signals to translate each contour element so that a three dimension surface is formed by a discrete matrix of individual pins. This self adjusting sheet metal forming die is used on a sheet metal press wherein sheet metal can be formed by pressing or stretch forming the metal against the contoured surface.

27 Claims, 6 Drawing Sheets

ADJUSTABLE FORM DIE

BACKGROUND OF THE INVENTION

1. Field of the Invention

The present invention relates to adjustable form dies and specifically to a computer controlled self-adjusting form die comprising a plurality of pins that are height adjustable to form a controlled three dimensional surface for forming sheet metal products and the like.

2. Description of the Prior Art

The usual tooling process begins once the sheet metal product contours have been described and are finalized. The typical process requires the manufacture of a contoured form die, followed by a testing phase (often known as tool "prove-out") to assure that the form die imparts the proper contour to the sheet metal product. Should changes to the contour of the die be required (for example, to make springback adjustments) then rework of the existing die or re-manufacture of a new die becomes necessary in order to achieve the appropriate contour changes.

Presently, predesigned and specifically designed form dies are utilized to achieve contoured surfaces for sheet metal product and the like. Manufacturers usually maintain and store sets of specifically designed form dies and, depending upon the application, will retrieve the appropriate die depending upon the surface contour desired to be achieved. This is not a cost-effective method since a new form die has to be manufactured for each new application, not to mention the attendant costs of testing and storing the new form die.

SUMMARY OF THE INVENTION

It is an object of the instant invention to provide a self-adjusting form die that is computer controlled for imparting proper contours to a sheet metal product.

It is another object of the instant invention to provide an adjustable form die that permits virtually instant contour changes to the forming tool by computer control without the need to manufacture templates, molds, and without having to remove the die from the metal forming press when changing surface contours.

It is yet another object of the instant invention to provide an adjustable form die that obviates the need for a manufacturing facility to fabricate, store, and retrieve specially designed forming dies for each contour surface application.

It is yet a further object of the present invention to provide an adjustable form die that reduces the costs of individual form die production, inventory, and storage, by allowing rapid prototyping and rapid "tweaking" of finished parts during tool prove-out process.

Still another object of the instant invention is to provide an adjustable form die that is capable of changing its contour in real time when real time shape adjustments are required.

A further object of the invention is to provide an adjustable form die that includes a computer means having memory and for contour storage and retrieval.

Yet still another object of the present invention is to provide an adjustable form die that includes a multi-pin design with feedback controlled multi-motor pin positioning.

These and other objects of the invention are attained an adjustable die for forming a three-dimensional contoured die surface. The adjustable form die comprises a plurality of individual pin means arranged in a matrix of rows and columns and mounted within a frame, each pin means capable of moving in an extended and retracted position along a single axis. A control means generates positional information for each of the plurality of individual pins of the matrix. A drive means is provided at each row or column of the matrix and responds to the positional information provided by the control means for extending or retracting each pin of the row or column for a predetermined distance along its respective single axis, each drive means providing simultaneous movement of one or more pins in each row of said matrix to form a three dimensional contoured die surface.

DETAILED DESCRIPTION OF THE INVENTION

Figure 1:
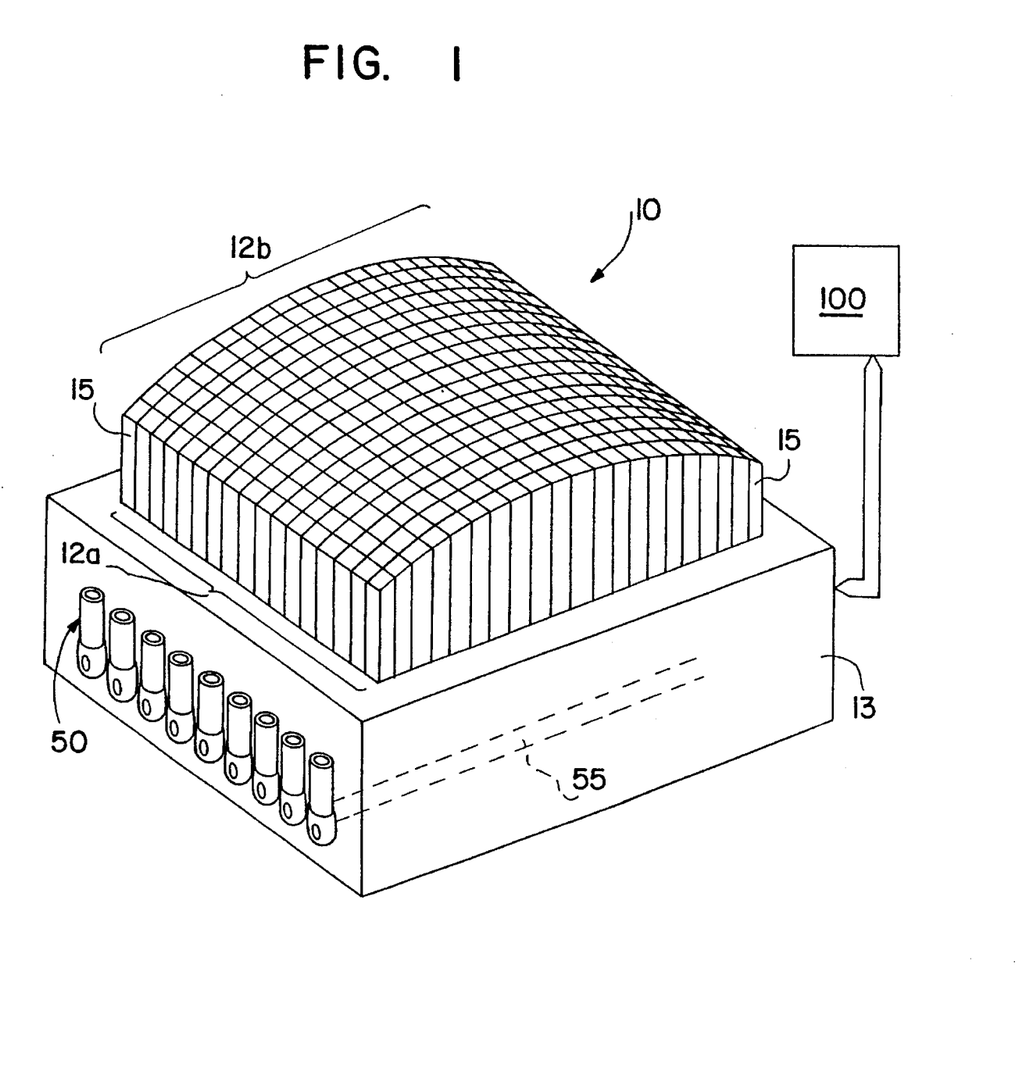
FIG. 1 is a perspective view of the adjustable form die of the instant invention.

As illustrated in FIG. 1, the form die apparatus 10 comprises a frame 13 for housing several rows 12a and columns 12b of adjacently positioned pins 15. In the preferred embodiment, each pin is a hollow square, approximately one inch in width and is spaced apart from each adjacent pin at a distance of one inch (center to center). Alternatively, as will be appreciated by one skilled in the art, pins 15 may be solid and even cylindrical in shape and having a one inch diameter. It is understood that the pin spacing distance is merely a design choice depending upon the configuration and thickness of the pins. One skilled in the art would recognize that adjacently located pins must be placed at a distance from each other sufficient to accommodate the movement of various mechanical components such as the electric drive motors 50 for adjusting the vertical translation of each pin as shown generally in FIG. 1.

Figure 2:
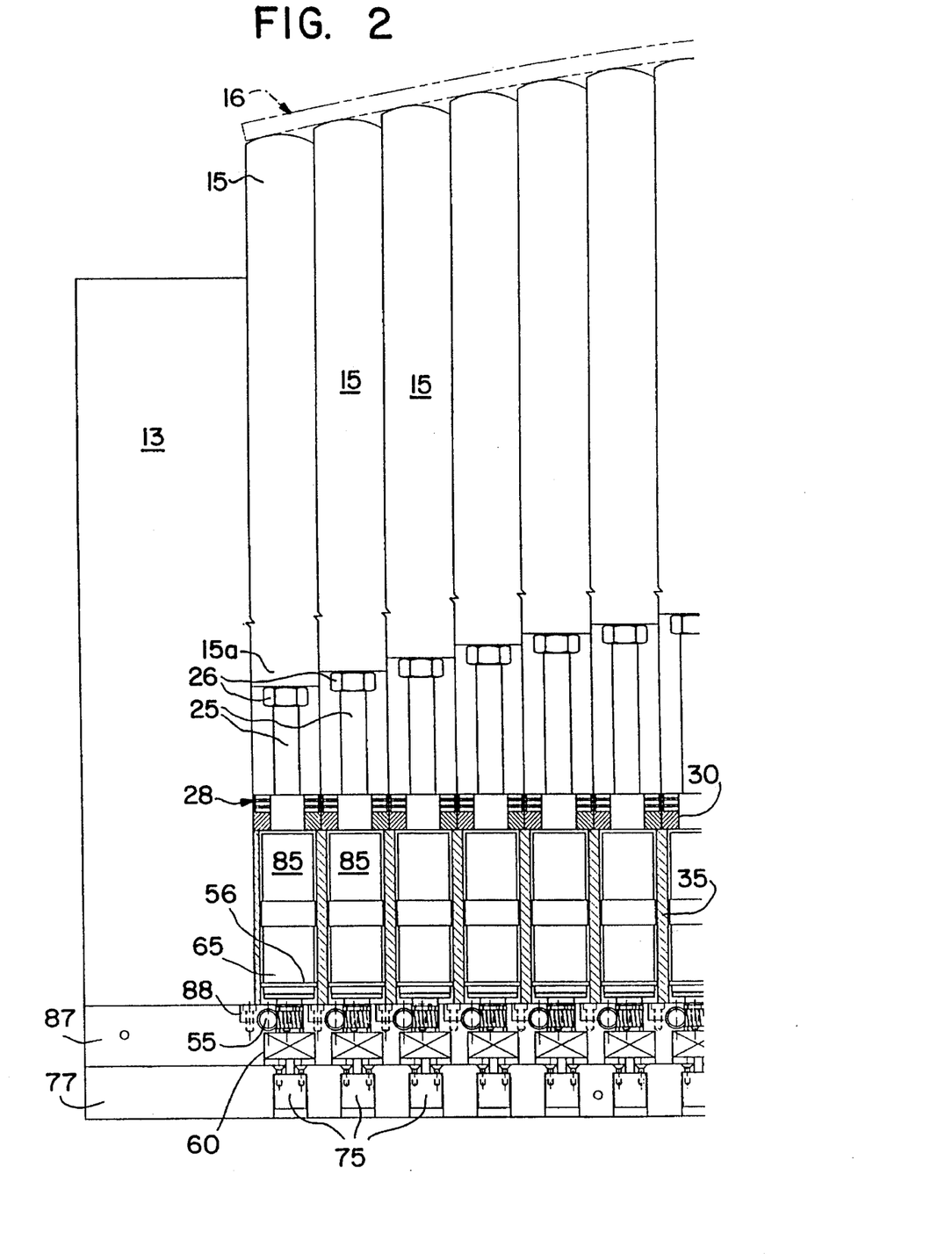
FIG. 2 is a schematic diagram of the mechanical layout of the adjustable form die showing several pins adjusted to different heights.

All pins, plates, and frame materials described hereinbelow are formed of heavy steel to assure that the die is rugged and will maintain maximum tool rigidity. Only the minimum amount of material is removed from the heavy steel die plates 77, 87, 30 and 35 (FIG. 3) so that maximum tool rigidity is retained. These plates are built up progressively so that disassembly for maintenance or repair is facilitated. Pin faces are spherically ground from hardened tool steel and made removable for easy replacement. Additionally, all parts may be specially coated with materials, for instance, PTFE, to minimize friction. As shown in FIG. 2, a hard rubber (or other elastomeric material) material 16 is placed on top of the pins 15 to protect the formed parts and ensure that bumps from the individual pin heads are not transmitted to the sheet metal product.

Figure 3:
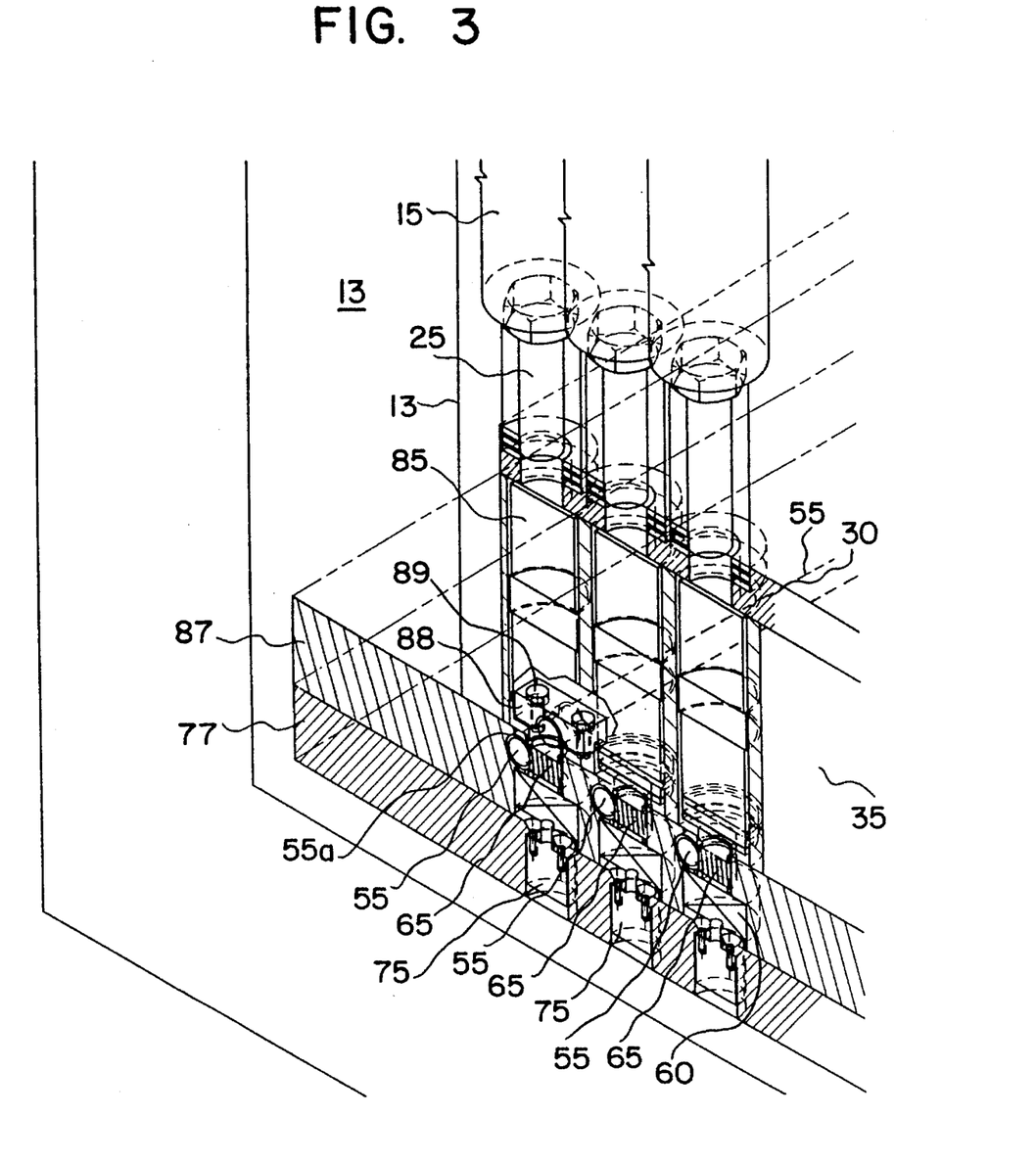
FIG. 3 illustrates an isometric breakaway view of adjustable form die pin layout.

As shown generally in FIGS. 1 through 3, vertical translation of the pins 15 occur using electric motors which drives a rotating threaded shaft or "lead screw" 25 for each pin located at each row 12a or column 12b of a matrix of pins. In the preferred embodiment, the pins 15 are hollow and square-shaped, so that they are unable to rotate within the form die frame 13. As mentioned above, each of the pins may be solid and/or shaped in a variety of ways that are largely determined by the types and thicknesses of material that are to be formed in a particular pressing application. Preferably, the pins 15 are permanently attached or welded to nuts 26 at the pin end 15a, and are drilled so that the inside diameter of the pin 15 closely fits the outside diameter of the rotating threaded shaft 25. One skilled in the art should recognize that the hollow pin 15 may alternately be of a one-piece semi- or fully threaded configuration for extending or retracting movement along rotating threaded shaft 25. The threaded pins 15 are each supported within frame 13 which reacts the pin side loads. The axial pins 15 loads are reacted by thrust bearings 28 which transfer axial loads when the pins are extending or retracting along their respective vertical axes to the forming machine's bed or platten.

As shown in FIGS. 2 and 3, each threaded shaft 25 is connected to the output side of an electric clutch 60. The electric clutch 60, when actuated, engages torque from a drive shaft 56 to rotate each pin's threaded shaft 25. When the clutch 60 is deactuated, torque from the drive shaft 56 will be disengaged from the pin's threaded shaft 25 and rotation of that shaft will terminate. A spur or pinion gear 65 located at the end of each drive shaft 56 assures constant torque to the drive shaft as long as it's respective motor (not shown) is turning. The spur or pinion gear 65 receives its torque via a worm gear 55a from a rotating worm gear shaft 55 which is provided for each row (or column) of pins and mounted at right angles to a row (or column) of pinion gears 65 and directly connected to an electric motor 50. Each worm gear shaft 55 has a plurality of worm gears, such as worm gear 55a shown in FIG. 3, that are spaced one inch apart (center to center distance) along the shaft 55 and associated with a respective pin 15 for engaging a respective right angle pinion gear 65. As shown in FIGS. 2 and 3, each worm gear shaft 55, drive shaft 56, pinion gear 65, and electric clutch 60 are housed in gear drive plate 87. Each worm gear shaft 55 is appropriately supported within the gear drive plate 87 by capped precision bearings 88 that are strategically placed at each drive shaft location to assure proper alignment, smooth operation, and long life. The capped bearings are fastened to the gear drive plate by fasteners 89.

As shown in FIGS. 2 and 3, a rotary optical encoder 75 is mounted within encoder housing plate 77 and provided for each pin 15 to provide positional feedback information for the control system 100 as will be explained in greater detail below. A power-off brake 85 associated with each pin is also provided within frame 13 for ensuring additional stability to the pin. When the clutch associated with that pin is de-actuated the pin has reached its final extended or retracted position. As will be explained in greater detail below in further view of FIGS. 4 and 5, the clutch 60 and power-off brake 85 are simultaneously controlled by control system 100 utilizing positional feedback information generated by rotary encoder 75; the brake being turned off when the clutch is engaging the threaded screw shaft 25 to enable axial movement of said pin.

Figure 4:
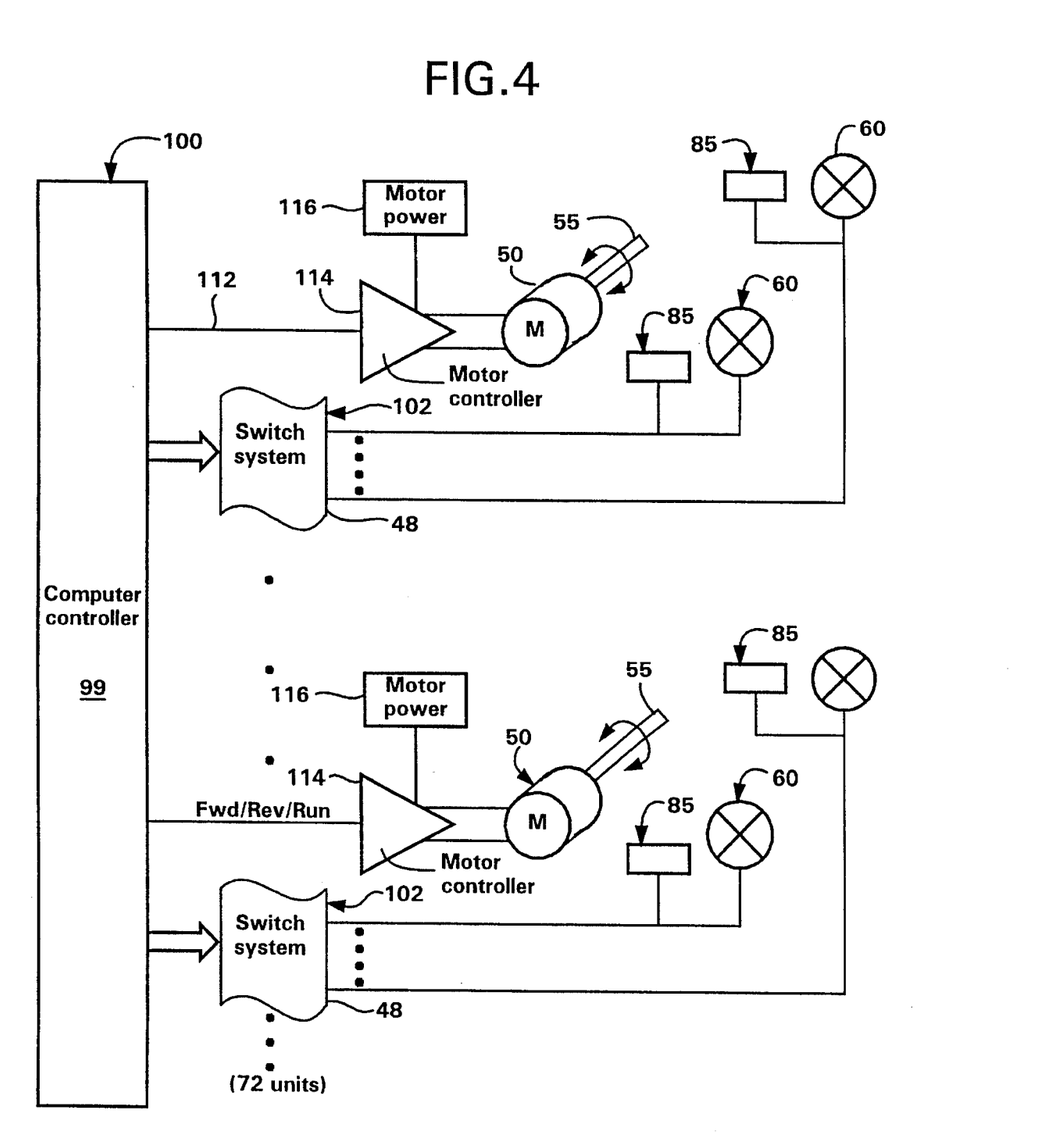
FIG. 4 is a circuit diagram illustrating the computer control system for controlling the adjustable form die of the instant invention.

In operation, an electric motor 50 drives a worm gear shaft 55 that has worm gear tap-off points at each pin location along its length. The motor is preferably bi-directional in that it could be powered to drive the worm gear shaft 55 in both forward and reverse directions; the forward direction when increasing vertical movement of the pin relative to a predetermined set of "home" position is desired, and, reverse direction when pin positioning needs to be tweaked or altered to allow for springback adjustments. As shown in FIG. 4, a suitable motor controller 114 and motor power device 116 is provided for each motor 50; the motor controller 114 receiving instructions from the computer controller 99 via line 112 for directional and speed information. The worm gear shaft 55 driven by each motor is long and can power a complete line of pins in a row/column. For example, given that each pin occupies 1 square inch of space, a form die that is four feet by six feet is configured with 48 pins in a line, and 72 lines yielding 3456 pins total. A worm gear shaft 55 could conceivably power either the 48 pin line or the 72 pin line depending upon motor torque considerations and cost. In the preferred embodiment, the motors 50 are stagger mounted on opposite sides of the frame to allow sufficient side clearance space for the motor housings. The concept is applicable to any number of pins per line and any number of lines.

As shown in FIGS. 1 and 2, each reversible motor 50 is linked directly to each pinion drive shaft 56 so that all the worm gears on each individual shaft turn together when it's respective motor is activated. The computer control system 100 sorts through the positional data that has been previously input, simultaneously enables each motor to drive its respective worm gear shaft and pins, and then individually addresses each "power-off" brake 85 and clutch unit 60 in the manner described below. The computer activates the appropriate brake/clutch unit to allow translational movement of its respective pin until the rotary encoder 75 has counted the required number of displacement pulses for its respective lead screw shaft. At that time, electrical power is withdrawn from that particular clutch and the brake, thus stopping the pin 15 in it's desired location while permitting it's driving spur gear and drive shaft to spin freely. The drive shaft 56 (located between the pinion gear 65 and clutch 60) and the threaded screw shaft 25 (located between the pin and the clutch), are not solidly connected until the electrical clutch 60 is activated. The "power off" brake 85 on each pin assures that there will be no relative pin movement during forming and provides positive locking in the event of electrical power loss.

Figure 5:
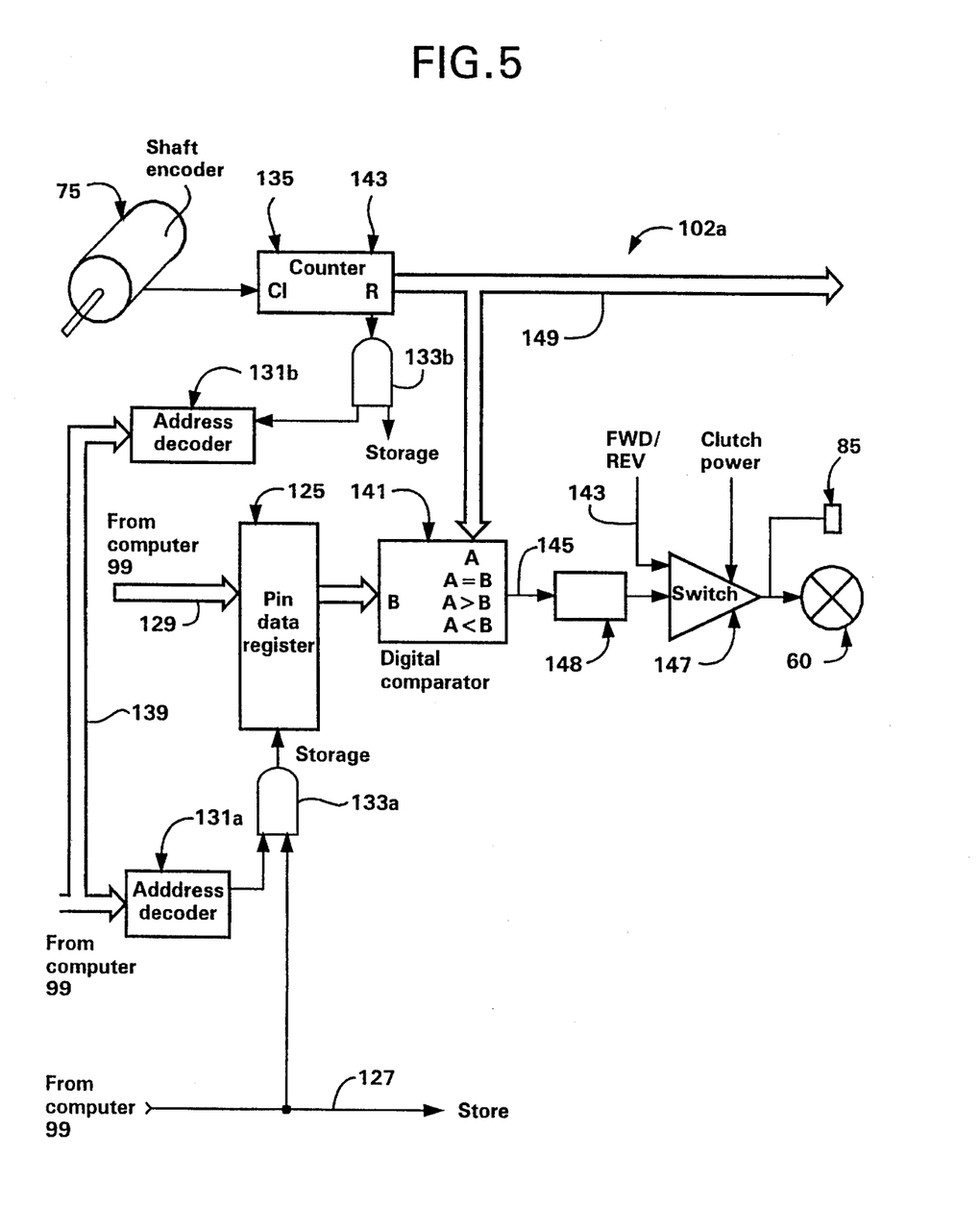
FIG. 5 is a circuit diagram illustrating the control logic for operating the clutch and power-off brake mechanism of a single pin of the adjustable form die.

As shown in FIG. 4, the computer control system 100 comprises a computer/controller 99, a switch system 102 comprising clutch control logic for every pin, motors 50 including motor controllers 114, and a clutch 60 for controlling the drive to each pin. The control logic for an individual pin of the adjustable die operates in the preferred embodiment as follows: Computer/controller 99 retrieves from memory storage, or, is input with a three-dimensional array of information representing the positions of each pin of the matrix of pins necessary to describe a three dimensional surface. The computer 99 is programmed to determine the extension required of each pin 15 of the die, and controls each individual switching system 102a as depicted in FIG. 5. Pin extension information, which may comprise a number representing the amount of count pulses necessary to achieve the desired translation of that pin relative to a zero (fully retracted) or "home" position, is transferred to a storage register 125 associated With that particular pin. It should be understood that with appropriate software programming, individual pin position information may consist of a number representing the amount of count pulses necessary to achieve a desired translation of that pin relative to any predetermined position and not necessarily a zero or fully retracted position.

Preferably, a data storage register 125 is provided for each pin 15 of the die. The data is transferred to the register 125 from the computer 99 via any appropriate data transfer configuration/protocol known to those skilled in the art. As illustrated in FIG. 5, pin extension data is provided to the storage register 125 on data bus 129. Pin address information is likewise provided to an address decoder 131a on data address bus 139. The decoder 131a addresses the particular data storage register in which information is to be stored. After the pin extension data and address location have been presented to the pin data storage register, the computer 99 issues a STORE command line 127 to the pin data register to initiate the transfer of pin extension information to the addressed storage register 125. It is understood to those skilled in the art that additional circuitry, such as AND gates 133a, b may be needed for writing data to the register 125 or for reading data from the digital counter 135, as will be explained below.

In a similar manner as described above, pin address information is also provided to address decoder 131b on data address bus 139. The decoder 131b addresses a counter 135 that is used to count the lead screw position/turns for the addressed pin. Counting the turns of the pin drive shaft 56 is accomplished by the rotary shaft encoder 75 which simply provides a count pulse for each turn of the lead screw engaged thereto. The count of each shaft for each pin may be reset to zero upon initialization. The number of pulses are counted by up/down counter 135 to determine the total amount of pin drive shaft 56 rotations and this number is communicated to a first input A of a digital comparator 141 via count bus 149. The current value of the count number is compared with the pin extension count value data value for that particular pin which is communicated to a second input B of the digital comparator 141. The comparator 141 will generate an appropriate logic level output signal 145 depending upon either of three conditions: A=B, when the current count value is equal to the programmed pin extension value; A<B, where the current count value is less than the programmed pin extension value; and A>B, when the current count value for the selected pin is greater than the programmed pin extension value. The output 145 generated by comparator 141 is used to control a switch 147 that activates/de-activates the clutch 60 and the brake 85 corresponding to the addressed pin. For instance, if the current count value of the rotary encoder 75 at input A is less than the programmed count value for the extension limit of the pin at input B, i.e., if A<B, then the clutch is activated and the drive shaft will engage the lead screw for that particular pin as it is being driven to its desired position. If the current count value of the rotary encoder 75 at input A is equal to or greater than the programmed value for the extension limit of the pin, i.e., if A≧B, then the clutch will be deactivated and the drive shaft will no longer engage the lead screw for that particular pin. Simultaneously, when the condition A<B is true, the power-off brake 85 for that particular pin will be deactivated as power is being supplied thereto. When the condition A≧B is reached, the power flow to brake 85 will be interrupted, and the brake will provide a stop to the pin at its programmed position.

Limit switches (not shown) may be provided with precise, repeatable "on-off" triggers to provide a "home" position in either the fully extended or fully retracted pin positions. The individual rotary encoders 75 may then provide incremental positioning information for communication to the computer control system 100 relative to either a "home" position, or from any other known position so that the contoured surface formed by the face of the pins can be modified slightly without having to return to a "home" position. The final coordinates of the positioning of each vertical pin location (relative to a "home" position) can be stored magnetically for future use.

As previously mentioned, a pin may be moved up/down to make minor corrections to a desired forming mold, for example, when "tweaking" or making springback adjustments. Motion of the pin 15 in both directions can be achieved by reversing the drive motor and activating alternate logic for the digital comparator 141. Thus, the computer 99 may generate drive signal 143 representing forward or reverse (extension or retraction) of the pin drive. As shown in FIG. 5, this forward/reverse signal 143 is tied to a forward/reverse logic circuit 148, so that the clutch may actuate/de-actuate properly when the pin is being retracted. Additionally, forward/reverse signal 143 is provided to the counter 135 so that the counter 135 may count down from its current value when a pin is being retracted. For instance, during tool prove-out, if a particular pin has to be retracted an incremental amount after reaching its desired position, new positional information has to be loaded within pin data register 125. This value provided to input B will necessarily be less than the current value of the counter 135 provided to input A of the comparator 141. If the current count value of the rotary encoder 75 at input A is greater than the programmed count value for the extension limit of the pin at input B, i.e., if A>B, and the forward/reverse signal 143 indicates reverse motion of the pin, then the clutch is activated and the drive shaft will engage the lead screw for that particular pin as it is being retracted to its desired position. If the current count value of the rotary encoder 75 at input A is equal to or less than the programmed value for the retraction limit of the pin, i.e., if A≦B, and the forward/reverse signal 143 indicates reverse motion of the pin, then the clutch will be deactivated and the drive shaft will no longer engage the lead screw for that particular pin. Simultaneously, when the condition A>B is true, and the forward reverse signal 143 indicates pin retraction, then the power-off brake 85 for that particular pin will be deactivated as power is being supplied thereto. When the condition A≦B is reached, then power flow to brake 85 will be interrupted, and the brake will provide a stop to the pin at its programmed position.

System timing is largely governed by the time necessary to drive the pins to full extension to create a new metal forming mold, and, is primarily determined by the response time of the clutch. The resolution required must not be exceeded during the clutch deactuation time to assure accurate pin positioning. Thus, the drive motor speed, and the pin speed are determined by the gearing ratios, the resolution, and the activation/de-activation time of the clutch. It is understood that each pin 15 of the adjustable form die 10 is provided with its own control circuitry 102a and logic thereby permitting all pins to be simultaneously driven. Thus, as shown in FIG. 4, there will be seventy-two (72) switching systems 102, each comprising forty-eight (48) individual control circuits 102a (FIG. 5). Alternatively, depending upon the design of the die and the number of pins thereof, there may be forty-eight (48) switching systems 102 for the adjustable form die, each comprising seventy-two (72) individual control circuits 102a.

In an alternative embodiment of the invention, and in view of FIG. 5, the adjustable form die 10 is completely controlled by a computer/controller 99 with only a system of clutch switches 147 and a drive motor 50 as hardware elements. In this embodiment, the computer 99 selects each pin clutch in sequence and then determines the motion required for that pin. The motor will drive the worm gear shaft and that motion will be sensed with the appropriate sensors as described above so that the CPU will simultaneously compare the current shaft position with programmed pin motion criteria. Through program control, the computer may then activate/deactivate all of the clutches 60 via switches 147. Shaft position could be fed to the computer with a shaft encoder, as described above, or, the motor could be of the stepping variety that will accurately and definitively move precise amounts in response to command pulses. As shown in FIG. 4, stepping motor/controller 114 is utilized and the computer 99 will generate the motor advance pulses. Motion can be provided for forward and reverse operation with appropriate pulse lines and commercially available motor controllers which provides a very high torque, precise angular motion, and virtually no accumulation of errors. It is desirable that the holding torque is also high, and as long as the motor is not overloaded or driven too fast, the position of the pin is accurately known as a function of the number of pulses/counts presented to the controllers. Since the computer 99 generates the pulse count information, it is available to control each clutch switch 147 as described above.

Figure 6:
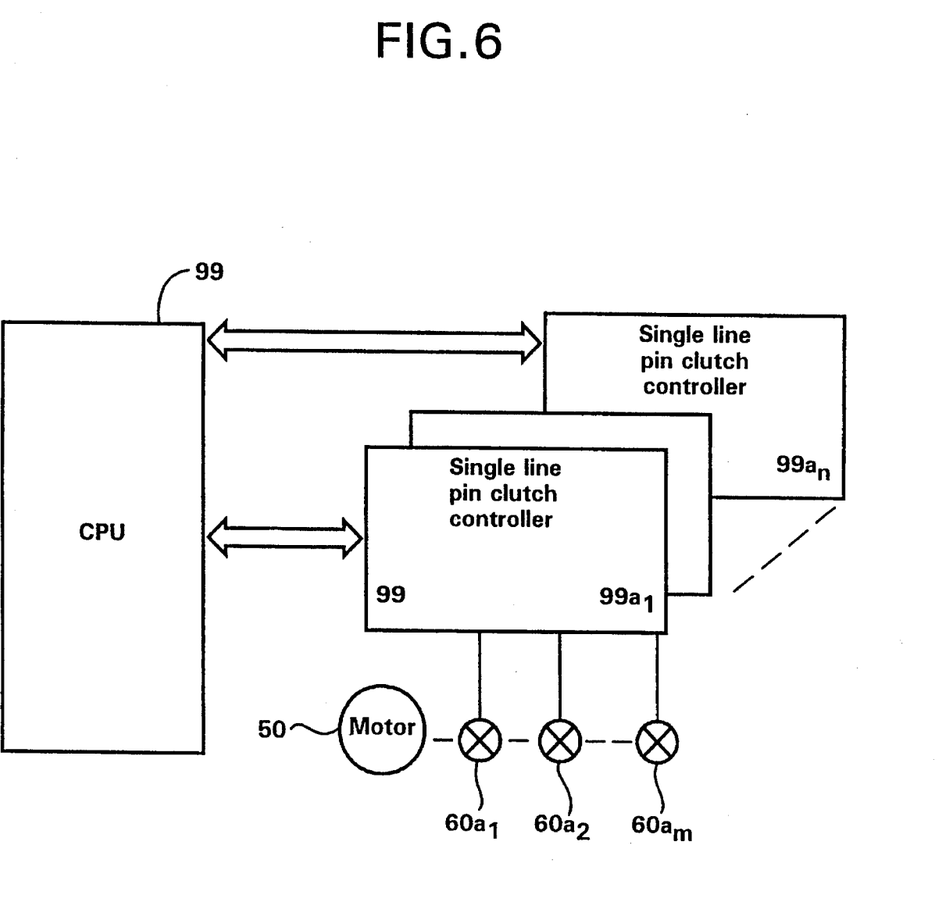
FIG. 6 illustrates a second embodiment of the computer control system for controlling the adjustable form die of the instant invention.

An option to the above described alternative embodiment, which uses a computer for control and switching, is to further distribute the computing load. In this embodiment, as shown in FIG. 6, the main computer/controller 99 would do the surface computations, and determine the required pin extension positions. The pin extension information is transferred to a number of smaller microcomputers/controllers 99a$_1$ to 99a$_n$ as shown in FIG. 6 that would replace the switching system 102 described above. The smaller microcomputer/controllers are loaded with a program that could control the motor drive 50 for a single line of pins. The controller, for e.g., 99a$_1$, would scan the array of pin locations, determine the clutches 60a$_1$ through 60a$_m$ that should be activated, broadcast appropriate control bits to activate them, and, drive the motor to the first position requiring a change to the clutch actuation conditions. Appropriate changes would be made to clutch actuation, and the motor would then be driven to the next location (pin distance), and the cycle repeated. In this way the microcontrollers need to provide motor control codes to position the pins, in addition to appropriate codes for actuating the clutches. The motors could be moved at high speed from one clutch activation change location to another, and dwell for only the time required for the clutch to change state. Since there are a limited number of clutches in each line the dwell time required for each line of pins is minimized, and the controller can slew the pins to the required positions as quickly as a position servo system will permit. This will reduce the total amount of time required to set the pins in the system. The pin lines are operated in parallel and are independently controlled as in the method of the invention. Thus, distributing the computing power can improve the system response time by permitting clutch control under software control instead of hardware control, and slewing at high rates with a minimum of stops to change clutch actuation signals.

Although shown and described in what we believed to be the most practical and preferred embodiments, it is apparent that departures from the specific methods and designs described and shown will suggest themselves to those skilled in the art and may be made without departing from the spirit and scope of the invention.

What is claimed is:

1. A self-adjusting die for forming a three-dimensional contoured die surface comprising:

a) a plurality of individual pin means defining a matrix of pin rows and pin columns, each said pin means independently movable in an extended and retracted position along a single axis;

(b) control means for generating desired positional information for each of said plurality of individual pins of said matrix;

(c) drive means having a drive motor and a first drive shaft for each row/column of said matrix of pins, each said first drive shaft having a plurality of worm gears rotating therewith and spaced apart at each pin location; and (d) torque engaging means corresponding to and operatively connected with each said pin means, each said torque engaging means selectively engaging said pin means to said first drive shaft to selectively supply torque to said corresponding pin means, said drive means and said torque engaging means being responsive to said positional information generated by said control means for providing simultaneous and independent axial movement of each said pin means of said matrix along each respective said single axis.

2. The self-adjusting die as claimed in claim 1 wherein said drive means further includes a plurality of rotatable second drive shaft means, each second drive shaft means associated with a corresponding worm gear and operatively connected therewith for receiving rotational motion therefrom, said rotatable second drive shaft means being threaded at an end for connection with a corresponding pin means.

3. The self-adjusting die as claimed in claim 2 wherein each said torque engaging means is responsive to a first control signal generated from said control means for engaging said first drive shaft means with said second drive shaft means to provide axial movement of said pin to a desired position, and, responsive to a second control signal for disengaging said first drive shaft means from said second drive shaft means to terminate axial movement of said pin means.

4. The self-adjusting die as claimed in claim 3 wherein each said torque engaging means includes a switch means responsive to said first control signal for enabling engagement of said first and second drive shaft means and, responsive to said second control signal for enabling disengagement of said first and second drive shaft means.

5. The self-adjusting die as claimed in claim 2 wherein each said second drive shaft means is positioned substantially perpendicular to its respective first drive shaft means.

6. The self-adjusting die as claimed in claim 2 wherein each said pin means includes means for converting rotational motion of said second drive shaft means into extending or retracting movement of its pin means along said single axis.

7. The self-adjusting die as claimed in claim 6 wherein each said converting means of said pin means includes a hollow, threaded interior for receiving said second drive shaft means.

8. The self-adjusting die as claimed in claim 1 wherein each said first drive shaft means rotates about an axis substantially perpendicular to said single axis of said pin means.

9. The self-adjusting die as claimed in claim 3 wherein each said pin means includes a braking means for actuating a positive stop of said pin means when said pin has reached a desired position.

10. The self-adjusting die as claimed in claim 9 wherein said control means simultaneously enables said braking means to actuate said positive stop and said torque engaging means to disengage each said pin from continued axial movement thereof.

11. The self-adjusting die as claimed in claim 9 wherein said control means enables said braking means to maintain the desired position of its respective pin in response to said second control signal generated by said control means.

12. The self-adjusting die as claimed in claim 4 wherein said control means includes a data storage means associated with each pin for storing desired positional information for that pin.

13. The self-adjusting die as claimed in claim 12 wherein said control means further includes rotary encoder means associated with each individual pin means and connected with each said second drive shaft means for counting the number of rotations of said second drive shaft means, wherein each rotation of said second drive shaft indicates movement of said pin means along said single axis, said rotary encoder means generating a pulse signal for each detected rotation of said second drive shaft means.

14. The self-adjusting die as claimed in claim 13 wherein said control system further includes a counter means associated with each said pin means of said matrix and communicating with said rotary encoder means for counting the number of pulse signals generated thereby, said counter means generating a counter output signal representing the current axial positioning of its associated pin means.

15. The self-adjusting die as claimed in claim 16 further including a comparator means associated with each individual pin means, wherein said current counter output signal of a respective pin means is input to a first input of said comparator, and said stored desired positional information for that pin means is input to a second input of said comparator, said comparator comparing a difference between said first and second inputs thereof and generating said first control signal indicating that said pin means has not reached a final position and generating said second control signal indicating that said pin means has reached said final position.

16. The self-adjusting die as claimed in claim 15 wherein said switch means associated with each said pin means is responsive to said second control signal for deactivating said torque engaging device to terminate movement of said pin means when said first and second inputs are equal.

17. The self-adjusting die as claimed in claim 15 wherein said switch means associated with each said pin means is responsive to said first control signal for activating said torque engaging device to enable movement of said pin means when said first and second inputs are not equal.

18. The self-adjusting die as claimed in claim 12 wherein said control means further includes a computer device for inputting desired positional information for said plurality of pin means into respective data storage means associated with said said plurality of pin means.

19. The self-adjusting die as claimed in claim 1 wherein each said drive motor enables forward or reverse rotation of said first drive shaft means, each said pin means moving toward an extended position along said single axis when said first drive shaft means rotates in a forward direction and moving in a retracted position when said first drive shaft means rotates in a reverse direction.

20. The self-adjusting die as claimed in claim 12 wherein said control means calculates desired positional data for changing the position of a said pin means relative to a predetermined home position.

21. The self-adjusting die as claimed in claim 20 wherein said predetermined home position corresponds to a position wherein each said pin means are in a fully retracted position.

22. The self-adjusting die as claimed in claim 20 wherein said predetermined home position corresponds to a position wherein each said pin means are in a fully extended position.

23. A method for forming a tool die having a plurality of pins arranged in a matrix comprising a plurality of rows/columns, said die including drive means having a drive motor for each row/column of said matrix of pins for rotating a first drive shaft, and torque engaging means corresponding to and operatively connected with each said pin for selectively engaging said drive means to selectively supply torque to said corresponding pin, said drive means and torque engaging means for independently driving each individual pin of said plurality to a desired position along a single axis, said method comprising the steps of:

(a) generating pin extension information for each pin of said matrix necessary to form a desired three-dimensional contoured surface:

(b) transferring each said pin extension information to a data storage means corresponding with each said pin means;

(c) actuating said drive means to drive each pin means of said matrix to its desired extended position, while (d) simultaneously comparing the actual position of each said pin means with the desired pin position information stored in its respective data storage means; and (e) terminating the motion of a said pin means when the actual position of that pin means is equal to the desired position stored in said data storage means.

24. The method for forming a tool die according to claim 23 wherein the comparing step (d) further includes the step of generating a first control signal for enabling continuous engagement of said torque engaging means with said drive means when said actual position of said pin means has not reached the desired pin position.

25. The method for forming a tool die according to claim 23 wherein said step (d) further includes the step of generating a second control signal for disengaging said torque engaging means from said drive means when said actual position of said pin means has reached its desired pin position.

26. The method for forming a tool die according to claim 25 wherein said step (d) further includes the step of actuating a positive stop by a braking means to prevent further movement of said pin means upon receipt of said second control signal.

27. A self-adjusting die for forming a three-dimensional contoured die surface comprising:

a) a plurality of individual pins defining a matrix of pin rows and pin columns, each said pin being independently movable in an extended and retracted position along a single axis;

(b) control means for generating desired positional information for each of said plurality of individual pins;

(c) drive means having a drive motor for driving at least one first drive shaft, each of said first drive shafts driving at least one of said row/column of said pins; and (d) torque engaging means corresponding to and operatively connected with each said pin, each said torque engaging means selectively engaging one of said first drive shafts to selectively supply torque to said corresponding pin, said drive means and said torque engaging means being responsive to said positional information generated by said control means for providing simultaneous and independent axial movement of each said pin of said matrix along each respective said single axis.

* * * * *